US010249901B2

(12) United States Patent
Moon et al.

(10) Patent No.: US 10,249,901 B2
(45) Date of Patent: Apr. 2, 2019

(54) ORGANIC-INORGANIC COMPOSITE ANION EXCHANGE MEMBRANE CONTAINING POLYVINYLIDENE FLUORIDE POLYMER FOR NON-AQUEOUS REDOX FLOW BATTERY AND METHOD FOR PREPARING THE SAME

(71) Applicant: GWANGJU INSTITUTE OF SCIENCE AND TECHNOLOGY, Gwangju (KR)

(72) Inventors: Seung-Hyeon Moon, Gwangju (KR); Sung-Hee Shin, Gwangju (KR); Yekyung Kim, Gwangju (KR); Ki Won Sung, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 637 days.

(21) Appl. No.: 14/585,767

(22) Filed: Dec. 30, 2014

(65) Prior Publication Data
US 2015/0228950 A1    Aug. 13, 2015

(30) Foreign Application Priority Data
Feb. 12, 2014    (KR) ........................ 10-2014-0016038

(51) Int. Cl.
| H01M 8/20 | (2006.01) |
| H01M 8/18 | (2006.01) |
| C08J 3/24 | (2006.01) |
| C08J 5/22 | (2006.01) |
| H01M 8/02 | (2016.01) |
| H01M 2/16 | (2006.01) |

(52) U.S. Cl.
CPC ............. *H01M 8/188* (2013.01); *C08J 3/246* (2013.01); *C08J 5/2287* (2013.01); *H01M 8/18* (2013.01); *H01M 8/20* (2013.01); *C08J 2300/208* (2013.01); *C08J 2327/16* (2013.01); *C08J 2345/00* (2013.01); *H01M 2/16* (2013.01); *H01M 8/02* (2013.01); *H01M 2300/0082* (2013.01); *Y02E 60/528* (2013.01)

(58) Field of Classification Search
CPC ............ H01M 2/16; H01M 8/02; H01M 8/18; H01M 8/20; H01M 8/188; H01M 2300/0082; C08J 3/246; C08J 5/2287; C08J 2345/00; C08J 2327/16; C08J 2300/208; Y02E 60/528
See application file for complete search history.

(56) References Cited

U.S. PATENT DOCUMENTS

2005/0238937 A1* 10/2005 Oren ...................... B01D 61/44
                                                            521/27
2007/0128512 A1*  6/2007 Kaimai .................. B01D 69/12
                                                            429/144
(Continued)

OTHER PUBLICATIONS

Journal of Membrane Science 340 (2009) 206-213.*
Journal of Membrane Science 337 (2009) 257-265.*
Polymer 50 (2009) 553-559r.*

*Primary Examiner* — Alexander Usyatinsky
(74) *Attorney, Agent, or Firm* — Hauptmann Ham, LLP

(57) ABSTRACT

An organic-inorganic composite anion exchange membrane for non-aqueous redox flow batteries, which contains a polyvinylidene fluoride polymer, and a method for preparing the same are disclosed.

7 Claims, 11 Drawing Sheets

(56) References Cited

U.S. PATENT DOCUMENTS

| | | | |
|---|---|---|---|
| 2013/0004819 A1* | 1/2013 | Mun | H01M 8/188 429/106 |
| 2013/0252137 A1* | 9/2013 | Zhang | C08J 5/22 429/516 |

* cited by examiner

ORGANIC-INORGANIC COMPOSITE ANION EXCHANGE MEMBRANE CONTAINING POLYVINYLIDENE FLUORIDE POLYMER FOR NON-AQUEOUS REDOX FLOW BATTERY AND METHOD FOR PREPARING THE SAME

CROSS REFERENCE TO RELATED APPLICATION

This application claims the benefit of Korean Patent Application No. 10-2014-0016038, filed on Feb. 12, 2014, entitled "ORGANIC-INORGANIC COMPOSITE ANION EXCHANGE MEMBRANE CONTAINING POLYVINYLIDENE FLUORIDE POLYMER FOR NON-AQUEOUS REDOX FLOW BATTERY, AND METHOD FOR PREPARING THE SAME", which is hereby incorporated by reference in its entirety into this application.

BACKGROUND

1. Technical Field

The present invention relates to an organic-inorganic composite anion exchange membrane for non-aqueous redox flow batteries, which contains a polyvinylidene fluoride polymer, and a method for preparing the same.

2. Description of the Related Art

As energy consumption based on fossil fuels increases worldwide, it has become an essential task to secure sustainable energy sources such as sunlight, wind power, tidal power, biomass, and the like in order to replace fossil fuels. To this end, many efforts have been actively made to develop a technology for producing and storing new forms of renewable energy. Thereamong, redox flow batteries have drawn considerable attention as environment-friendly medium or large energy storage devices.

A redox flow battery refers to a device that stores electrical energy as chemical energy through oxidation and reduction of active materials dissolved in electrolytes, wherein charged each electrolyte separated by a membrane are stored in an external negative electrolyte reservoir and a positive electrolyte reservoir, respectively. Specifically, the redox flow battery has an advantage in that its energy storage capacity can be reduced or enlarged through size adjustment of two external electrolyte reservoirs that store active materials.

According to solvent type, redox flow batteries can be broadly classified into aqueous redox flow batteries using water and non-aqueous redox flow batteries using an organic solvent. Studies have been mostly focused on the aqueous redox flow batteries.

An ion exchange membrane of the non-aqueous redox flow battery has a great influence on durability. In order to transfer charge carriers upon charging and discharging and to separate a positive electrolyte and a negative electrolyte, selection of an ion exchange membrane is crucial. The non-aqueous redox flow battery has drawbacks in that different redox pairs of positive and negative electrodes can be mixed with each other and cause mixed contamination of the electrolytes, thereby causing self-discharge.

In order to resolve such problems, ion exchange membranes having high ion selectivity must be used. However, since there is no satisfactory ion exchange membrane in the art, there is a need for development of a novel ion exchange membrane for non-aqueous redox flow batteries.

A polyvinylidene fluoride polymer is known as having high chemical and physical resistance, and has been employed in medical analysis systems, water treatment systems, and energy systems. Although there are some cases where a cation exchange membrane is prepared from the polyvinylidene fluoride polymer and applied to an aqueous redox flow battery system in order to enhance performance of the aqueous redox flow battery system, no case has been reported where the polyvinylidene fluoride polymer is applied to a non-aqueous redox flow system.

BRIEF SUMMARY

The present invention has been conceived to solve the problems in the art and embodiments of the present invention provide an anion exchange membrane for non-aqueous redox flow batteries, which includes: (A) silica particles; (B) a polyvinylidene fluoride polymer; and (C) a divinylbenzene polymer, and a method for preparing the same.

In accordance with one aspect of the present invention, an anion exchange membrane for non-aqueous redox flow batteries having a semi-interpenetrating structure as shown in FIG. 1 includes:

(A) silica particles;

(B) a polyvinylidene fluoride polymer represented by Formula 1:

(where l is as defined in the following description); and (C) a divinylbenzene polymer.

In accordance with another aspect of the present invention, a method for preparing an anion exchange membrane for non-aqueous redox flow batteries includes: (1) dispersing silica nanopowder in a first solvent, followed by adding a polyvinylidene fluoride polymer to obtain a first polymer mixture solution; (2) adding a monomer, a crosslinking agent and an initiator to the first polymer mixture solution, followed by stirring the resulting mixture to obtain a second polymer mixture solution; (3) casting the second polymer mixture solution to a glass plate, followed by thermal polymerization at a temperature of 50° C. to 100° C. to obtain a polymer membrane; and (4) dipping the polymer membrane in a tertiary amine compound or an alkyl compound to obtain an anion exchange membrane.

According to embodiments of the present invention, when used together with silica particles, the polyvinylidene fluoride polymer improves physical strength and thermal stability of organic polymers, and the anion exchange membrane prepared using the same shows less change in shrinkage and swelling than Neosepta AHA anion exchange membranes in the related art, thereby providing excellent dimensional stability. Therefore, the polyvinylidene fluoride polymer according to the embodiments of the present invention has good properties in terms of mechanical strength, heat resistance and chemical resistance, while securing high coulombic efficiency and high voltage efficiency.

BRIEF DESCRIPTION OF THE DRAWINGS

The above and other aspects, features, and advantages of the present invention will become apparent from the detailed description of the following embodiments in conjunction with the accompanying drawings, in which.

DETAILED DESCRIPTION

Figure 1:
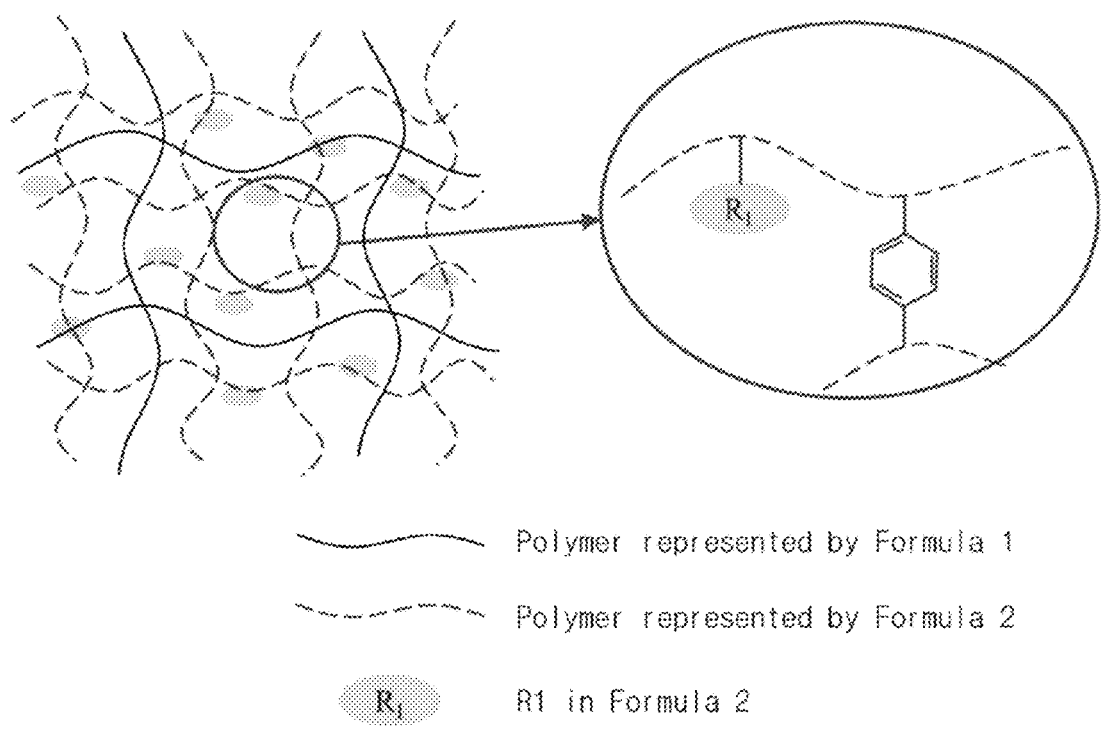
FIG. 1 is a diagram of a semi-interpenetrating structure composed of a polyvinylidene fluoride polymer and a divinylbenzene polymer according to one embodiment of the present invention.
Figure 2:
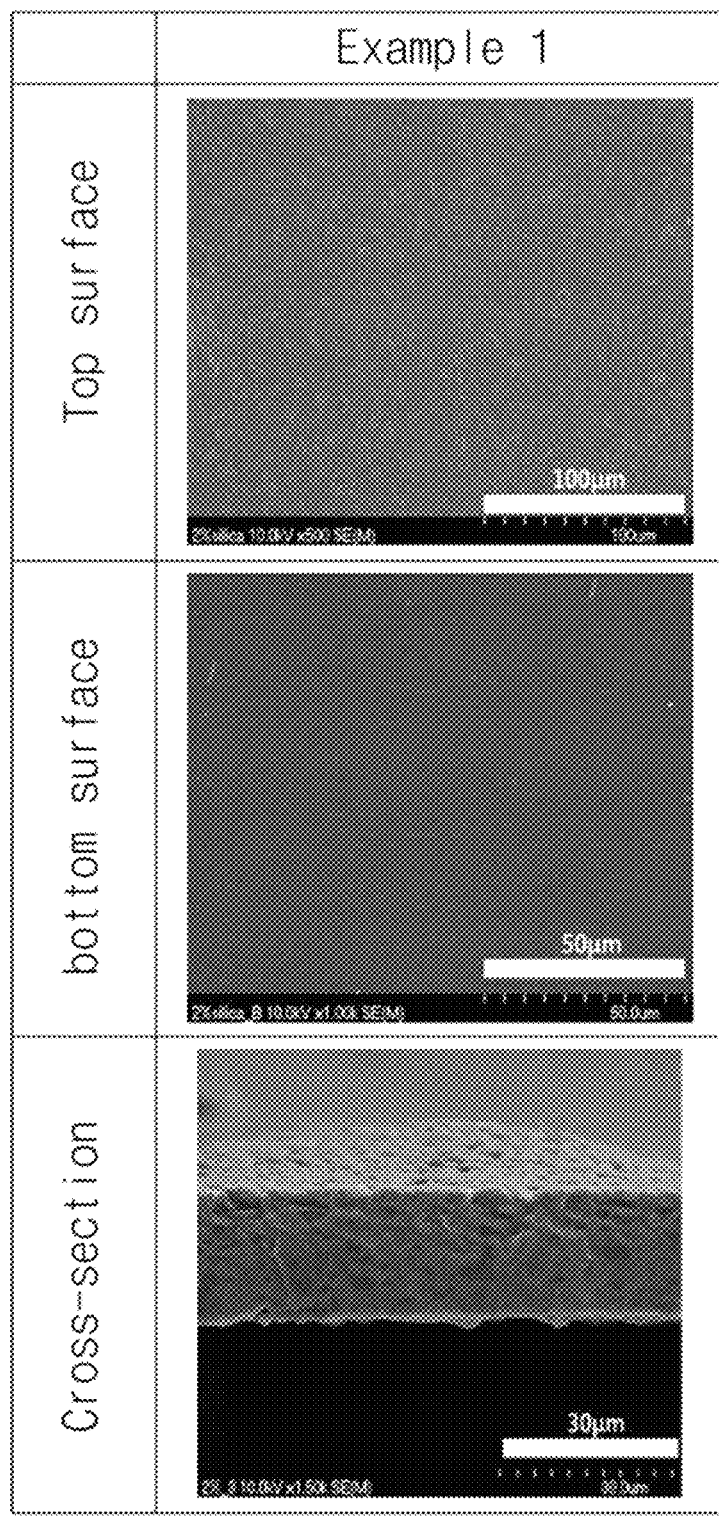
FIG. 2 shows an top surface, a bottom surface and a cross-sectional surface of an organic-inorganic composite anion exchange membrane according to one embodiment of the present invention, wherein silica particles were added in an amount of 2% by weight (wt %) based on the amount of polyvinylidene fluoride and glycidyl methacrylate was used as a monomer.
Figure 3:
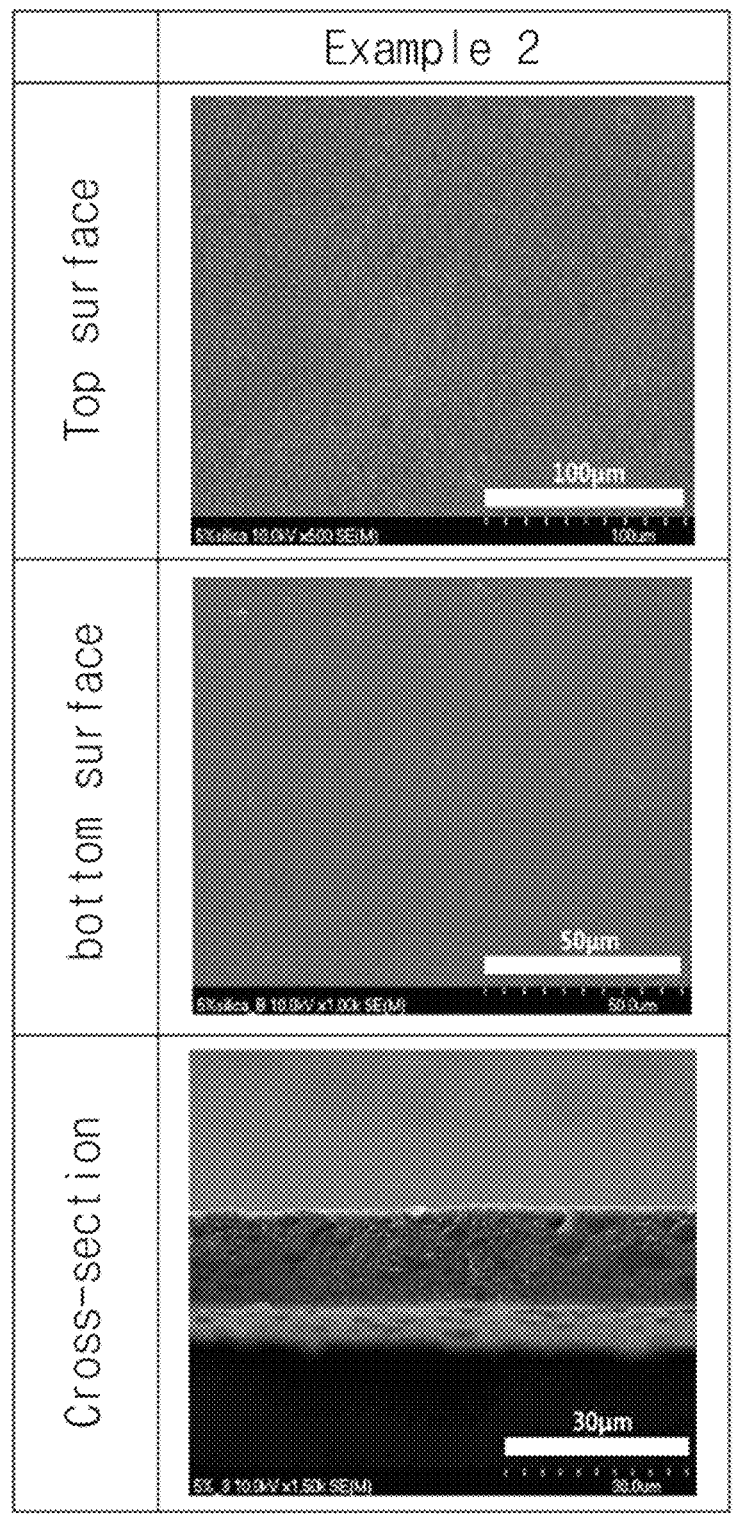
FIG. 3 shows an top surface, a bottom surface and a cross-sectional surface of an organic-inorganic composite anion exchange membrane according to one embodiment of the present invention, wherein silica particles were added in an amount of 5 wt % based on the amount of polyvinylidene fluoride and glycidyl methacrylate was used as a monomer.
Figure 4:
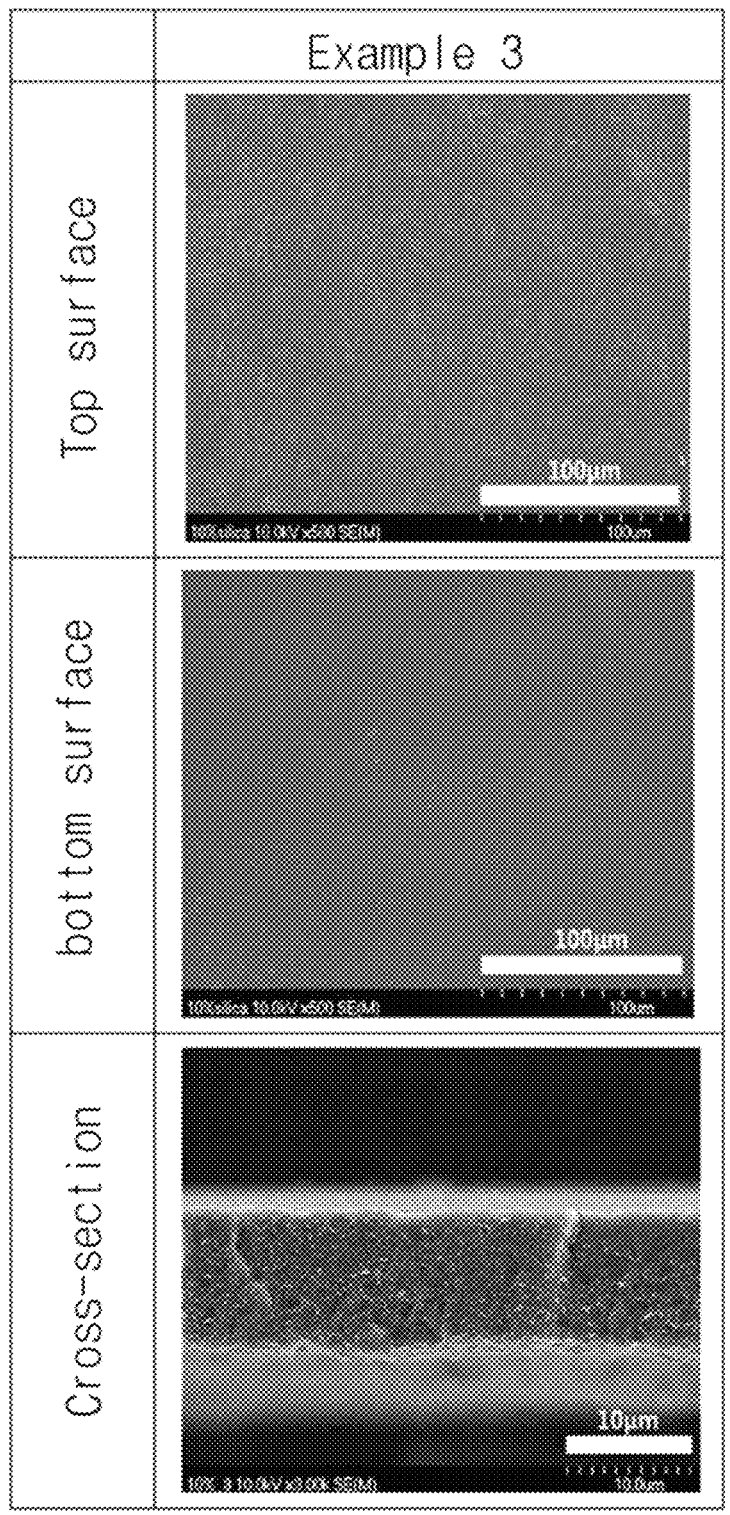
FIG. 4 shows an top surface, a bottom surface and a cross-sectional surface of an organic-inorganic composite anion exchange membrane according to one embodiment of the present invention, wherein silica particles were added in an amount of 10 wt % based on the amount of polyvinylidene fluoride and glycidyl methacrylate was used as a monomer.
Figure 5:
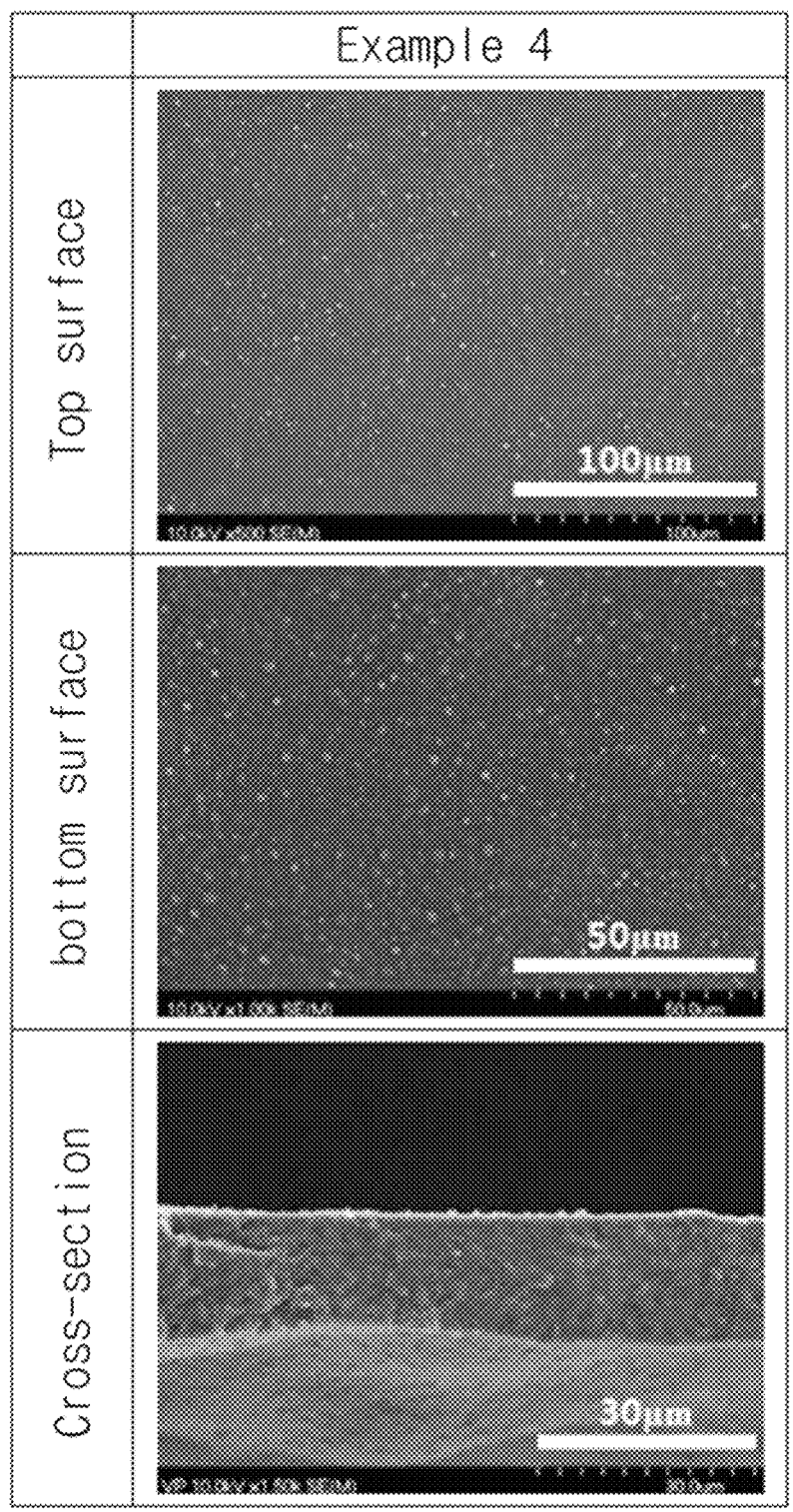
FIG. 5 shows an top surface, a bottom surface and a cross-sectional surface of an organic-inorganic composite anion exchange membrane according to one embodiment of the present invention, wherein silica particles were added in an amount of 5 wt % based on the amount of polyvinylidene fluoride and 4-vinylpyridine was used as a monomer.

Hereinafter, various aspects and embodiments of the present invention will be described in detail.

In accordance with one aspect of the present invention, an anion exchange membrane for non-aqueous redox flow batteries includes:

(A) silica particles;
(B) a polyvinylidene fluoride polymer represented by Formula 1:

(where $l$ is an integer ranging from 5,000 to 500,000); and (C) a divinylbenzene polymer, wherein the divinylbenzene polymer is obtained by reacting a monomer represented by Formula 2 with a divinylbenzene crosslinking agent and an initiator,

(where $R^1$ is at least one selected from the group consisting of a $C_1$ to $C_6$ alkyl amine cation unsubstituted or substituted with at least one selected from a linear or branched $C_1$ to $C_6$ alkyl group and a hydroxyl group, a $C_1$ to $C6$ alkoxyalkyl amine cation unsubstituted or substituted with at least one selected from a linear or branched $C_1$ to $C_6$ alkyl group and a hydroxyl group, a $C_1$ to $C_6$ acetoxyalkyl amine cation unsubstituted or substituted with at least one selected from a linear or branched $C_1$ to $C_6$ alkyl group and a hydroxyl group, and a $C_5$ to $C_{20}$ heteroaryl cation substituted with a linear or branched $C_1$ to $C_6$ alkyl group;

$R^2$ is H or $CH_3$; and heteroaryl includes at least one hetero atom selected from N, O and S).

In one embodiment, the divinyl polymer may be a polymer having a structure selected from among structures represented by Formulae 3, 3a and 3b, or a mixture thereof:

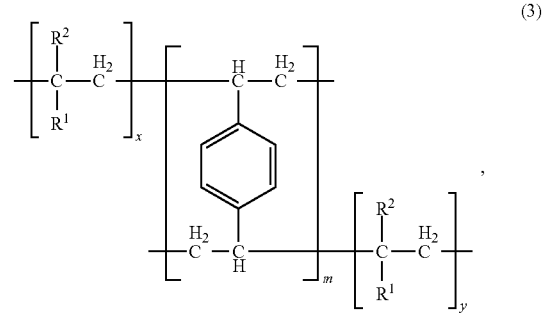

where m is an integer ranging from 1 to 500,000, and $1 \leq x+y$ (integer)$\leq 500{,}000$;

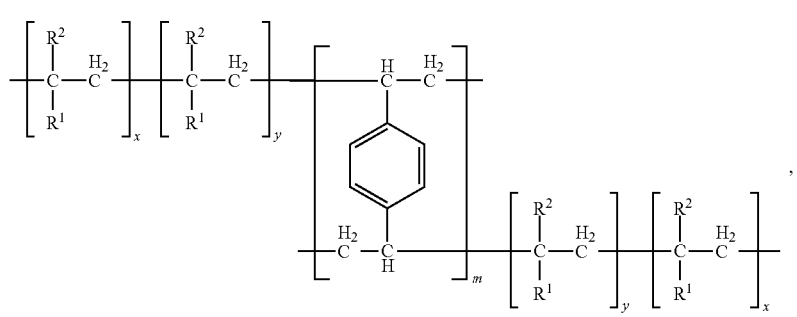
(3a)

where two x's are identical or different from each other, four y's are identical or different from one another, m is an integer ranging from 1 to 500,000, and 1≤x+y (integer)≤500,000; and

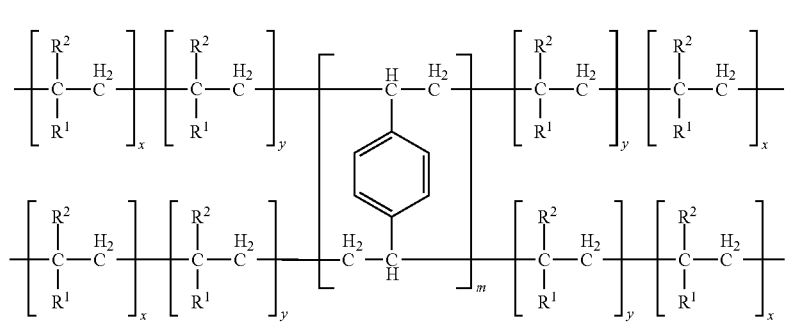
(3b)

where four x's are identical or different from one another, four y's are identical or different from one another, m is an integer ranging from 1 to 500,000, and 1≤x+y (integer)≤500,000.

In another embodiment, $R^1$ may be at least one selected from the group consisting of a $C_1$ to $C_6$ acetoxyalkyl amine cation substituted with at least one selected from a linear or branched $C_1$ to $C_6$ alkyl group and a hydroxyl group, a pyridine cation substituted with a linear or branched $C_1$ to $C_6$ alkyl group, a pyrrole cation substituted with a linear or branched $C_1$ to $C_6$ alkyl group, an indole cation substituted with linear or branched $C_1$ to $C_6$ alkyl group, a carbazole cation substituted with a linear or branched $C_1$ to $C_6$ alkyl group, a pyrimidine cation substituted with a linear or branched $C_1$ to $C_6$ alkyl group, an imidazole pyridinyl cation substituted with a linear or branched $C_1$ to $C_6$ alkyl group, and a pyrazolyl cation substituted with a linear or branched $C_1$ to $C_6$ alkyl group;

$R^2$ is H or $CH_3$;

m is an integer ranging from 1 to 100,000; and 1≤x+y (integer)≤100,000.

In a further embodiment, $R^1$ may be at least one selected from among

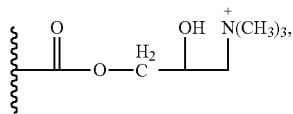

-continued

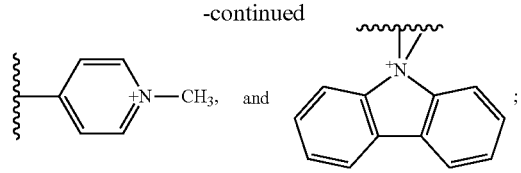

$R^2$ is H or $CH_3$;

m is an integer ranging from 1 to 100,000; and

1≤x+y (integer)≤100,000.

$R^2$ may be H or $CH_3$, depending upon the kinds of monomers. When glycidyl methacrylate is used as a monomer, $CH_3$ is placed at the $R^2$ site. When 4-vinylpyridine or N-vinylcarbazole is used as a monomer, H is placed at the $R^2$ site.

As shown in FIG. 1, the polyvinylidene fluoride polymer represented by Formula 1 and the divinylbenzene polymer represented by Formula 2 are not chemically cross-linked, but their polymer chains are physically entangled to form a semi-interpenetrating structure. More specifically, the polyvinylidene fluoride polymer represented by Formula 1 is penetrated into a divinylbenzene polymer net represented by Formula 2, thereby forming an entangled structure.

A monomer including a cation functional group at the $R^1$ site within the divinylbenzene polymer represented by Formula 2 and a divinylbenzene compound may be chemically cross-linked in a repetitive manner at random.

According to embodiments of the present invention, when used together with silica particles, the polyvinylidene fluoride polymer improves physical strength and thermal stability of organic polymers, and the anion exchange membrane prepared using the same shows less change in shrinkage and swelling than Neosepta AHA anion exchange membranes in the related art, thereby providing excellent dimensional stability. Therefore, the polyvinylidene fluoride polymer has good properties in terms of mechanical strength, heat resistance and chemical resistance, while securing high coulombic efficiency and high voltage efficiency.

In one embodiment, the silica particles may be present in an amount of 1 part by weight to 10 parts by weight based on the amount of the polyvinylidene fluoride polymer.

According to embodiments of the present invention, in anion exchange membranes for non-aqueous redox flow batteries, since the silica particles are inorganic materials added in order to increase ionic conductivity while minimizing resistance of the anion exchange membrane, the amount of the silica particles is an important factor. If the amount of the silica particles is less than 1 part by weight based on the amount of the polyvinylidene fluoride polymer, there can be a problem of deterioration in ion selectivity.

If the amount of the silica particles exceeds 10 parts by weight based on the amount of the polyvinylidene fluoride polymer, electrolyte uptake amount can be increased, but the silica particles can be aggregated, thereby causing deterioration not only in ion selectivity but also in homogeneity and flatness of the anion exchange membrane.

In another embodiment, the silica particles may have a size of 5 nm to 20 nm.

If the silica particles have a particle size of less than 5 nm, there are problems in that, due to poor penetration of electrolytes, the electrolyte uptake amount can be decreased, thereby causing increase in electrical resistance of the anion exchange membrane. If the silica particles have a size greater than 20 nm, there is a problem in that ion exchange capability can be deteriorated.

In a further embodiment, the anion exchange membrane for non-aqueous redox flow batteries may have a thickness of 10 μm to 100 μm.

If the anion exchange membrane has a thickness of less than 10 μm, the anion exchange membrane has a very thin thickness to provide low mechanical strength, thereby causing problems in preparation of batteries. If the anion exchange membrane has a thickness greater than 100 μm, there is a problem in that the anion exchange membrane can have increased resistance.

In yet another embodiment, the anion exchange membrane may have an ionic conductivity of $2.4 \times 10^{-4}$ S/cm or more.

In accordance with another aspect of the present invention, the anion exchange membrane for non-aqueous redox flow batteries may be prepared in the following manner:

(1) dispersing silica nanopowder in a first solvent, followed by adding a polyvinylidene fluoride polymer to obtain a polymer mixture solution;

(2) adding a monomer, a crosslinking agent and an initiator to the polymer mixture solution of Step (1), followed by stirring the resulting matter to obtain a polymer mixture solution;

(3) casting the polymer mixture solution of Step (2) to a glass plate, followed by thermal polymerization at a temperature of 50° C. to 100° C. to obtain a polymer membrane; and (4) dipping the polymer membrane of Step (3) in a tertiary amine compound or an alkyl compound to obtain an anion exchange membrane.

In one embodiment, the silica nanopowder may be added in an amount of 1 part by weight to 10 parts by weight based on the amount of the polyvinylidene fluoride.

In another embodiment, the silica nanopowder may have a particle size of 5 nm to 20 nm.

In a further embodiment, the polyvinylidene fluoride (PVDF) may be added in an amount of 10 parts by weight to 25 parts by weight based on the total weight of the first solvent.

In yet another embodiment, the first solvent may include at least one selected from among N,N-dimethylacetamide, N,N-dimethylformamide, dimethylsulfoxide, hexamethyl phosphoramide, triethyl phosphate, trimethyl phosphate, tetramethylurea, methyl ethyl ketone, N-methyl-2-pyrrolidone, chloroform, tetrahydrofuran, benzene, toluene, xylene, and acetone.

In yet another embodiment, the monomer may include at least one selected from among glycidyl methacrylate, 4-vinylpyridine, N-vinylcarbazole, vinylindole, vinylpyrimidine, vinyl imidazole pyridinyl, and vinyl pyrazolyl.

In yet another embodiment, the crosslinking agent may include at least one selected from among divinylbenzene, ethylene glycol diacrylate, di(ethylene glycol) diacrylate, tetra(ethylene glycol) diacrylate, ethylene glycol dimethacrylate, di(ethylene glycol) dimethacrylate, tri(ethylene glycol) dimethacrylate, N,N'-methylene bisacrylamide, and N,N'-(1,2-dihydroxyethylene)bisacrylamide.

In yet another embodiment, the initiator may include at least one selected from among benzoyl peroxide, acetyl peroxide, lauroyl peroxide, 2,2'-azobisisobutyronitrile, tert-butyl peroxide, 4,4-azobis(4-cyanovaleric acid), 1,1'-azobis (cyclohexanecarbonitrile), and tert-butyl peracetate.

In yet another embodiment, the tertiary amine compound may include at least one selected from among trimethylamine, triethylamine, diethylmethylamine, tripropylamine, tributylamine, and tetramethylethylene diammonium. The alkyl compound may be at least one of methyl iodide and ethyl iodide.

In accordance with a further aspect of the invention, a non-aqueous redox flow battery includes: a positive electrolyte; a negative electrolyte; and an anion exchange membrane disposed between the positive electrolyte and the negative electrolyte.

According to one embodiment, the anion exchange membrane is applied to a non-aqueous redox flow battery, whereby the non-aqueous redox flow battery has improved energy efficiency.

Hereinafter, the present invention will be described in more detail with reference to some examples. It should be understood that these examples are provided for illustration only and are not to be construed in any way as limiting the present invention. Further, it should be understood that various modifications can be made by those skilled in the art without departing from the scope of the present invention including the following examples even though the modifications are not based on specific experimental results.

Example 1: Organic-Inorganic Composite Anion Exchange Membrane-1

0.050 g of silica ($SiO_2$) nanopowder (Aldrich S5130, 7 nm) (2 wt % based on the weight of PVDF) and 25 mL of N,N-dimethyl acetamide were mixed, followed by adding 2.5 g of polyvinylidene fluoride (Aldrich 347078, Mw: 530,000) to the mixture to prepare a homogeneous polymer solution.

To the polymer solution, 6.72 mL of glycidyl methacrylate as a monomer, 1.2 mL of divinylbenzene as a crosslinking agent and 0.05 g of benzoyl peroxide as an initiator were added, followed by mechanical stirring at 70° C. or more for 40 minutes to prepare a polymer solution.

Subsequently, the polymer solution was cast on a glass plate while adjusting the thickness (30 μm-40 μm) using a doctor blade. The glass plate having the polymer solution cast thereon was flattened and subjected to thermal polymerization in an oven at 90° C. for 12 hours, and the polymer membrane on the glass plate was sufficiently impregnated in distilled water, followed by separating the polymer membrane from the glass plate.

In order to introduce an amine group into the polymer membrane, the cast membrane was dipped in trimethylamine (Aldrich 92262, 45 wt %) and subjected to amination at room temperature for 12 hours. After amination, the remaining trimethylamine was washed with distilled water several times, followed by sufficiently impregnating in 1M NaOH to prepare an ion exchange membrane substituted with $OH^-$.

Example 2: Organic-Inorganic Composite Anion Exchange Membrane-2

An organic-inorganic composite anion exchange membrane was prepared in the same manner as in Example 1 except that 0.125 g of silica nanopowder (5 wt % based on the amount of polyvinylidene fluoride) was further added in preparation of the polymer solution.

Example 3: Organic-Inorganic Composite Anion Exchange Membrane-3

An organic-inorganic composite anion exchange membrane was prepared in the same manner as in Example 1 except that 0.250 g of silica nanopowder (10 wt % based on the amount of polyvinylidene fluoride) was further added in preparation of the polymer solution.

Example 4: Organic-Inorganic Composite Anion Exchange Membrane-4

An organic-inorganic composite anion exchange membrane was prepared in the same manner as in Example 2 except that 5.06 mL of 4-vinylpyridine was used instead of glycidyl methacrylate and the cast membrane was impregnated in a mixed solution of methyl iodide (Sigma, I8507) and petroleum ether (Sigma, 32247) in a ratio of 1:4 instead of the amination procedure.

Example 5: Organic-Inorganic Composite Anion Exchange Membrane-5

An organic-inorganic composite anion exchange membrane was prepared in the same manner as in Example 2 except that 2 g of N-vinylcarbazole was used instead of glycidyl methacrylate and the cast membrane was impregnated in a mixed solution of methyl iodide (Sigma, I8507) and petroleum ether (Sigma, 32247) in a ratio of 1:4 instead of the amination procedure.

Comparative Example 1: Organic-Inorganic Composite Anion Exchange Membrane-6

An organic-inorganic composite anion exchange membrane was prepared in the same manner as in Example 1 except that silica nanopowder was not used.

Comparative Example 2: Neosepta AHA Anion Exchange Membrane

A commercially available anion exchange membrane Neosepta AHA (Astom Corporation, thickness: 187 μm) for non-aqueous redox flow batteries was evaluated as a control group.

Experimental Example 1: Identification of Surface and Cross-Sectional Structure of Anion Exchange Membrane for Non-Aqueous Redox Flow Batteries The surfaces and cross-sections of the anion exchange membranes obtained in Examples 1 to 5 and Comparative Example 1 were identified through scanning electron microscopy (SEM). Results are shown in FIGS. 2 to 7.

As shown in FIGS. 2 to 7, the anion exchange membranes of Examples 1 to 4 and Comparative Example 1 had top surfaces filled with silica nanopowder without void due to closely dispersed silica nanopowder according to the amount of silica nanopowder. The anion exchange membrane of Example 5 had voids of about 1 μm in size at a top surface thereof, about 5 μm in size at a bottom surface thereof, and about 3 μm in size at a cross-section thereof.

Experimental Example 2: Measurement of Electrolyte Uptake and Swelling Ratio of Anion Exchange Membrane for Non-Aqueous Redox Flow Batteries-1

In order to measure electrolyte uptake and swelling ratio, the anion exchange membranes of Examples 1 to 3 and Comparative Examples 1 and 2 were dried at 50° C. for 12 hours or more, followed by cutting into circular samples having a diameter of 18 mm, and measuring dry weight (Wdry) and dry thickness (Hdry). Then, the membranes of Examples 1 to 3 and Comparative Examples 1 and 2 were impregnated and stored in 0.01 M $V(acac)_3$ electrolyte solution prepared using acetonitrile as a solvent for 24 hours.

After 24 hours, the impregnated membranes were taken out and the electrolyte remaining on the surface of the membrane was removed. The weight ($W_{wet}$) and the thickness ($H_{wet}$) of each membrane were measured. The electrolyte uptake was calculated according to Equation 1 and the swelling ratio was calculated according to Equation 2. The measurement results are shown in Table 1.

$$\text{Electrolyte uptake (\%)} = \frac{W_{wet} - W_{dry}}{W_{dry}} \times 100 \quad \langle\text{Equation 1}\rangle$$

$$\text{Swelling ratio (\%, thickness)} = \frac{H_{wet} - H_{dry}}{H_{dry}} \times 100 \quad \langle\text{Equation 2}\rangle$$

TABLE 1

<Measurement results of electrolyte uptake and swelling ratio>

|  | Electrolyte uptake (%) | Swelling ratio (%) |
|---|---|---|
| Example 1 | 20.27 | 5.8 |
| Example 2 | 21.73 | 7.6 |
| Example 3 | 36.02 | 5.3 |
| Comparative Example 1 | 17.73 | 7.4 |
| Comparative Example 2 | 28.10 | 8.6 |

As shown in Table 1, the electrolyte uptake of Examples 1 to 3 and Comparative Examples 1 and 2 increased with increasing silica content. The swelling ratios of Examples 1 to 3 were similar to or lower than that of Comparative Examples 1 and 2. Specifically, since the swelling ratios of Examples 1 to 3 were much lower than that of a commercially available anion exchange membrane Neosepta AHA (Comparative Example 2), it was identified that the membranes of Examples 1 to 3 could be used as an anion exchange membrane for redox flow batteries having both excellent electrolyte uptake and dimensional stability.

Experimental Example 3: Measurement of Electrolyte Uptake and Swelling Ratio of Anion Exchange Membrane for Non-Aqueous Redox Flow Battery-2

In order to measure electrolyte uptake and swelling ratio at high concentration of electrolyte, the electrolyte uptake and swelling ratio were measured in the same manner as in Experimental Example 1 except that the anion exchange membranes of Examples 2, 4 and 5 and 1 M TEABF$_4$ electrolyte solution were used. Results are shown in Table 2.

TABLE 2

<Measurement results of electrolyte uptake and swelling ratio>

| | Electrolyte uptake (%) | Swelling ratio (%) |
|---|---|---|
| Example 2 | 35.93 | −2.5 |
| Example 4 | 33.02 | 2.4 |
| Example 5 | 55.31 | −5.9 |

As shown in Table 2, Example 4 showed good electrolyte uptake as well as the best dimensional stability in view of the lowest swelling ratio of 2.4%. Further, Example 5 showed an electrolyte uptake of 55.31%, which was much better than that of Example 2 including the same amount of silica particles. This appears to stem from the effects according to the kinds of monomers.

Experimental Example 4: Measurement of Ion Exchange Capacity of Anion Exchange Membrane for Non-Aqueous Redox Flow Batteries Ion exchange capacity refers to an index representing an amount of functional groups affixed to an ion exchange membrane, which means that the index is proportional to ion exchange capacity. The ion exchange capacities of the anion exchange membranes were measured through Mohr titration.

The anion exchange membranes of Examples 1 to 3 and Comparative Examples 1 and 2 were dried at 50° C. for 12 hours or more to measure dry weight. The dried membranes were impregnated in 1 M NaCl solution for 12 hours or more to substitute the functional groups of the anion exchange membranes into the form of Cl$^-$, followed by removing NaCl remaining on the surfaces of the anion exchange membranes with distilled water. The resulting membranes were again impregnated in 1 M NaNO$_3$ solution to substitute the functional groups into the form of NO$_3^-$.

After that, Cl$^-$ ions remaining in the solution used to impregnate the membranes were titrated using a 0.1 N AgNO$_3$ solution and 5% K$_2$CrO$_4$ as an indicator agent.

The ion exchange capacity of each of the membranes was calculated according to Equation 3. Results are shown in Table 3.

$$IEC \ (meq/g) = \frac{C_{AgNO_3} \times V_{AgNO_3}}{W_{dry}} \qquad \langle \text{Equation 3} \rangle$$

TABLE 3

<Comparison of ion exchange capacity>

| | Ion exchange capacity (meq/g) |
|---|---|
| Example 1 | 1.35 |
| Example 2 | 1.55 |
| Example 3 | 1.57 |
| Example 4 | 1.12 |
| Example 5 | 0.72 |
| Comparative Example 1 | 0.75 |
| Comparative Example 2 | 1.34 |

As shown in Table 3, comparison of anion exchange capacity of the anion exchange membranes of Examples 1 to 3 and Comparative Example 1 showed that ion exchange capacity was proportional to the amount of silica nanopowder used. Specifically, the anion exchange membranes of Examples 2 and 3 had much higher ion exchange capacity than that of the commercially available anion exchange membrane, that is, the anion exchange membrane of Comparative Example 2.

In addition, the anion exchange membranes of Example 4 in which 4-vinylpyridine monomer was used had slightly lower ion exchange capacity than that of Example 2 in which glycidyl methacrylate monomer was used. The anion exchange membranes of Example 5 in which N-vinylcarbazole monomer was used had a porous structure, which provides smooth transfer of ions through void of the membrane, thereby reducing ion selectivity, as observed in scanning electron micrographs of FIG. 6.

Experimental Example 5: Measurement of Ionic Conductivity of Anion Exchange Membrane for Non-Aqueous Redox Flow Batteries-1

In order to maintain Donnan equilibrium during operation of the non-aqueous redox flow battery, transfer of charge carrier ions (BF$_4^-$) passing through the membrane should be performed smoothly. In order to compare the degree of ions passing through the membrane quantitatively, ionic conductivity was measured. The ionic conductivity was measured by AC electrochemical impedance spectroscopy.

The anion exchange membranes of Examples 1 to 3 and Comparative Examples 1 and 2 were disposed, respectively, between platinum-titanium electrodes, and resistance of each membrane was measured with 0.1 M TEABF$_4$ electrolyte.

In order to calculate ionic conductivity of the supporting electrolyte, membrane electrical resistance was measured, and then ionic conductivity was calculated according to Equation 4. Results are shown in Table 4.

$$\text{Ion conductivity (S/cm)} = \frac{l}{MER}, \qquad \langle \text{Equation 4} \rangle$$

wherein l is a thickness of the membrane and MER is resistance of the membrane.

TABLE 4

<Comparison of ionic conductivity>

| | Ionic conductivity (mS/cm) |
|---|---|
| Example 1 | 0.14 |
| Example 2 | 0.19 |
| Example 3 | 0.18 |
| Comparative Example 1 | 0.09 |
| Comparative Example 2 | 0.11 |

As shown in Table 4, the anion exchange membranes of Examples 1 and 2 and Comparative Example 1 showed increased ionic conductivity proportional to the presence and content of silica particles. Example 3 showed decreased ionic conductivity regardless of the content of silica particles due to aggregation of the silica particles. It was found that the anion exchange membranes of Examples 1 to 5 showed higher ion exchange capacity than the commercially available anion exchange membrane of Comparative Example 2.

Experimental Example 6: Measurement of Ionic Conductivity of Anion Exchange Membrane for Non-Aqueous Redox Flow Batteries-2

Ionic conductivity was measured in the same manner as in Experimental Example 5 except that the anion exchange membranes of Examples 2, 4 and 5 and 1 M $TEABF_4$ electrolyte were used. Results are shown in Table 5.

TABLE 5

<Comparison of ionic conductivity>

| | Ionic conductivity (mS/cm) |
|---|---|
| Example 2 | 0.33 |
| Example 4 | 0.39 |
| Example 5 | 10.11 |

As shown in Table 5, the anion exchange membranes of Example 2, 4 and 5 showed good ionic conductivity. Specifically, it could be seen that Example 5 had ionic conductivity about 30 times higher than Example 2.

Figure 6:
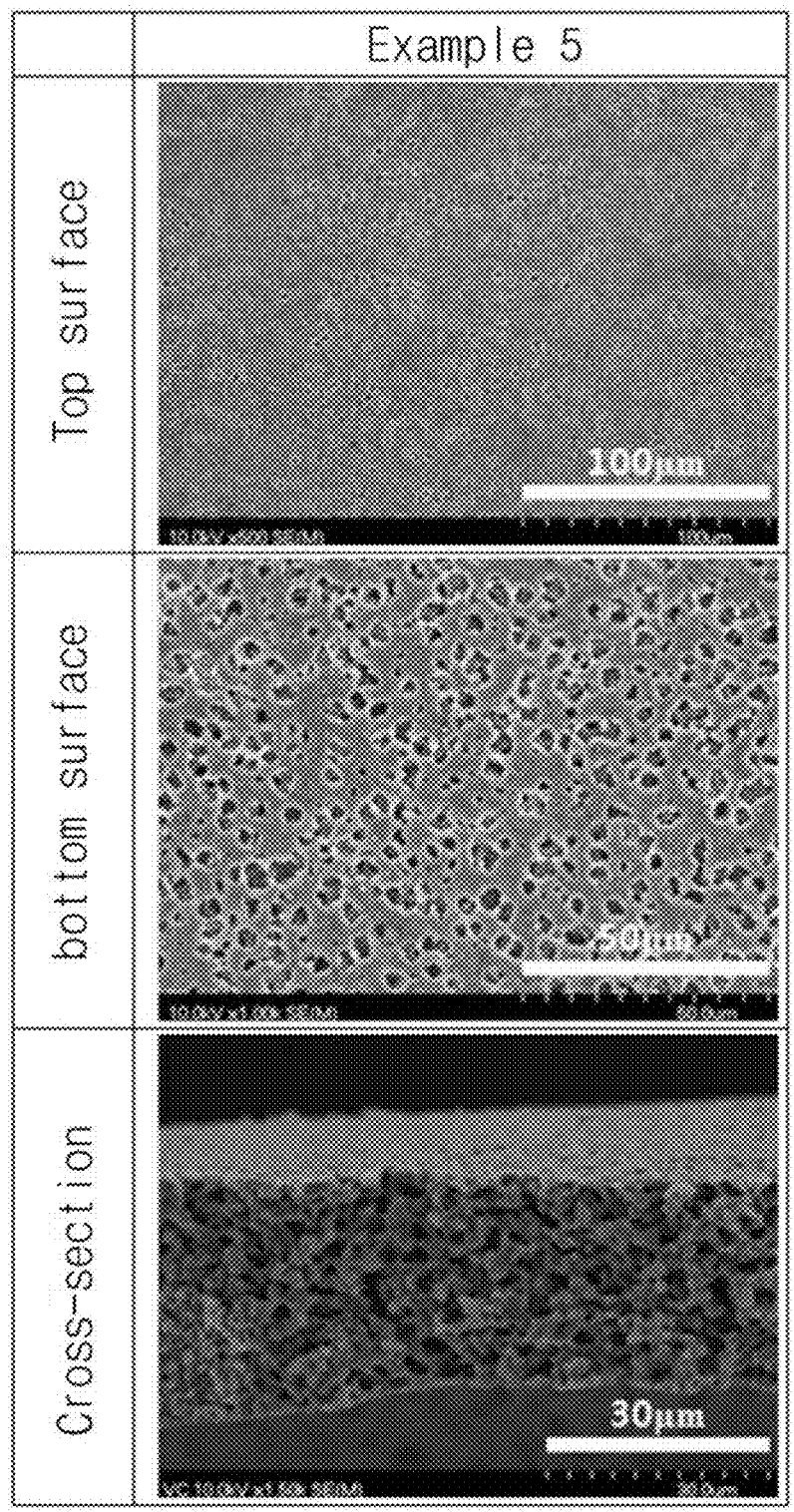
FIG. 6 shows an top surface, a bottom surface and a cross-sectional surface of an organic-inorganic composite anion exchange membrane according to one embodiment of the present invention, wherein silica particles were added in an amount of 5 wt % based on the amount of polyvinylidene fluoride and N-vinylcarbazole was used as a monomer.
Figure 7:
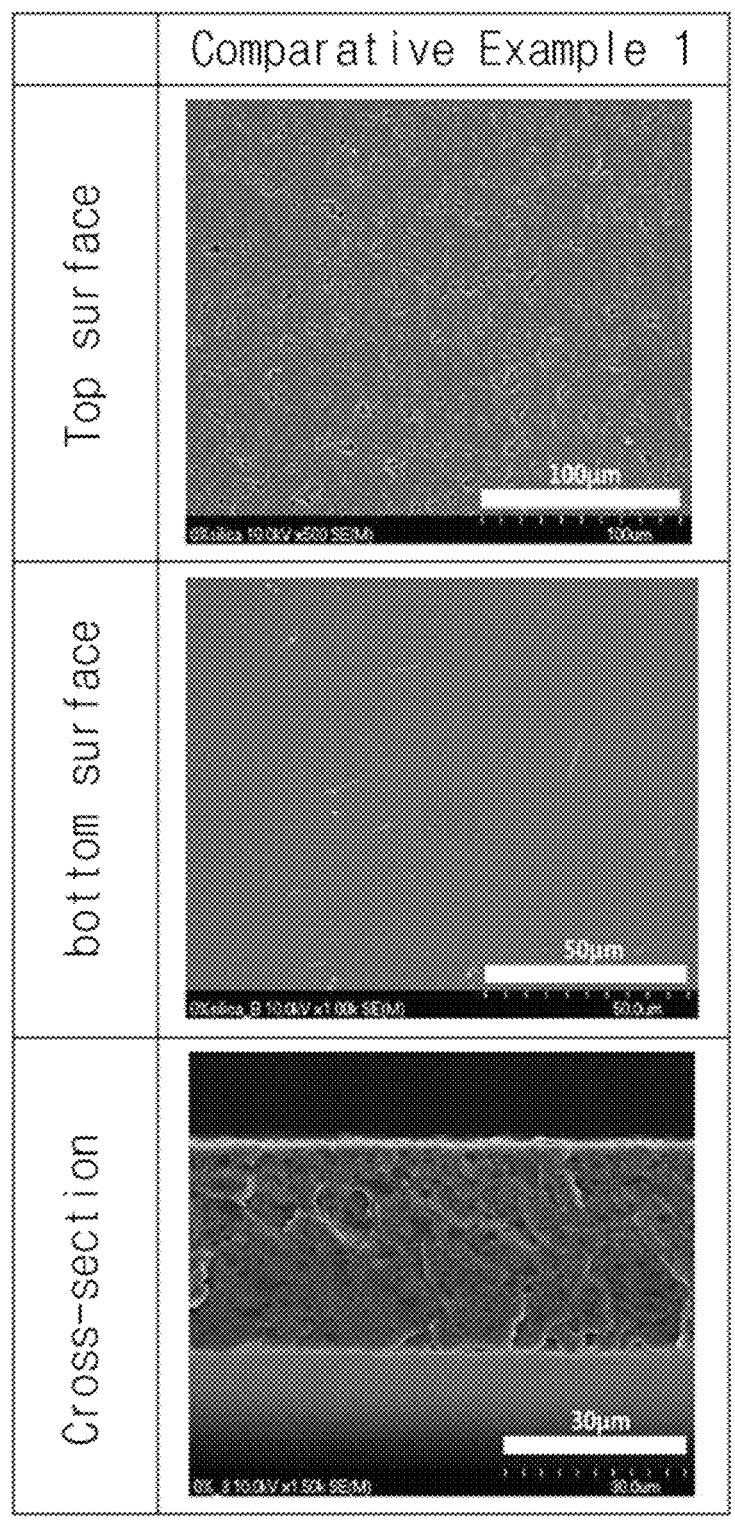
FIG. 7 shows an top surface, a bottom surface and a cross-sectional surface of an organic-inorganic composite anion exchange membrane according to one embodiment of the present invention, wherein silica particles were not used and glycidyl methacrylate was used as a monomer.

It was determined that the anion exchange membrane of Example 5 had a porous structure, which permitted smooth transfer of ions through voids of the membrane, thereby exhibiting high ionic conductivity, as observed in scanning electron micrographs of FIG. 6.

Experimental Example 7: Comparison of Coulombic Efficiency of Anion Exchange Membrane for Non-Aqueous Redox Flow Batteries Depending Upon Content of Silica In order to confirm performance of each of the organic-inorganic composite anion exchange membranes of Examples 1 to 3 and Comparative Examples 1 and 2, a unit cell was fabricated and an experiment was performed using a battery cycler (WBCS3000, Wonatech Co.) to determine membrane efficiencies thereof.

Performance of each of the organic-inorganic composite anion exchange membranes was evaluated under conditions that electrode reaction occurred in an area of 25 $cm^2$ and 40 mL of 0.01 M $V(acac)_3$/0.1 M $TEABF_4$ electrolyte was used as both electrolytes.

Charge and discharge of the unit cell were repeated at a constant current density of 0.1 $mA/cm^2$ and cut-off voltages of 1.7 V and 2.5 V.

Figure 8:
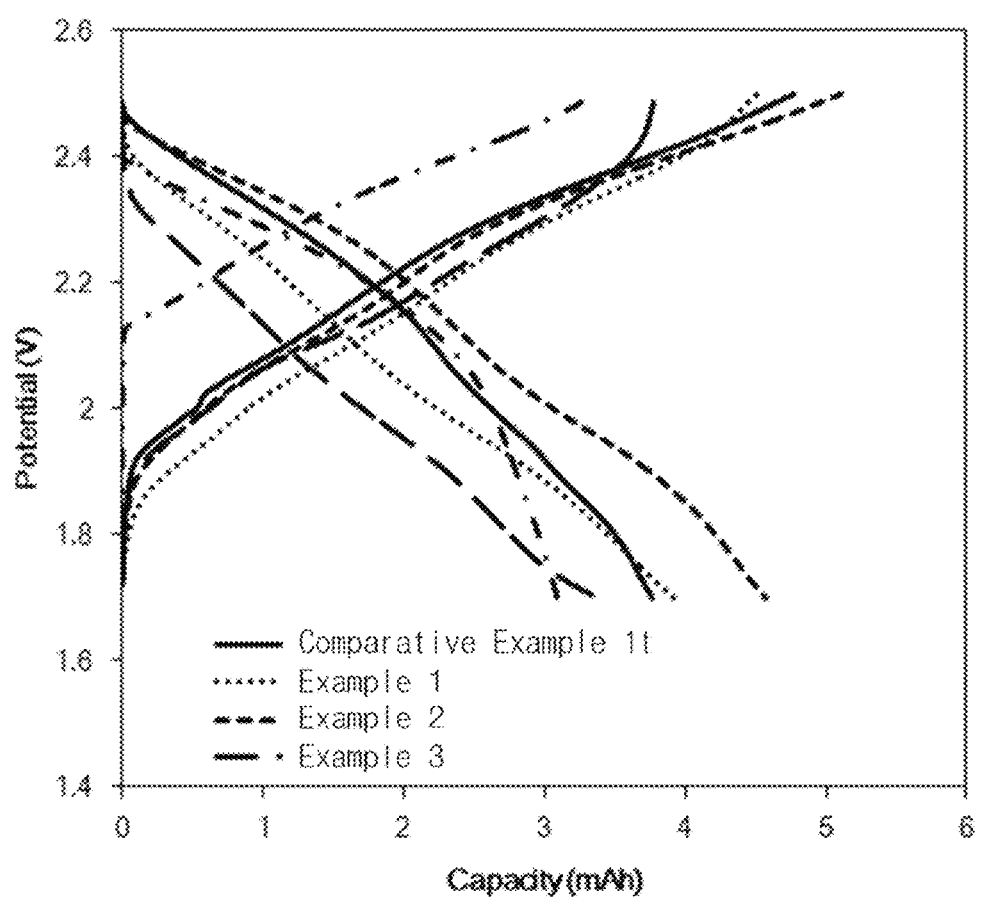
FIG. 8 is a graph depicting relationship between potential and capacity of organic-inorganic composite anion exchange membranes having different silica contents.
Figure 9:
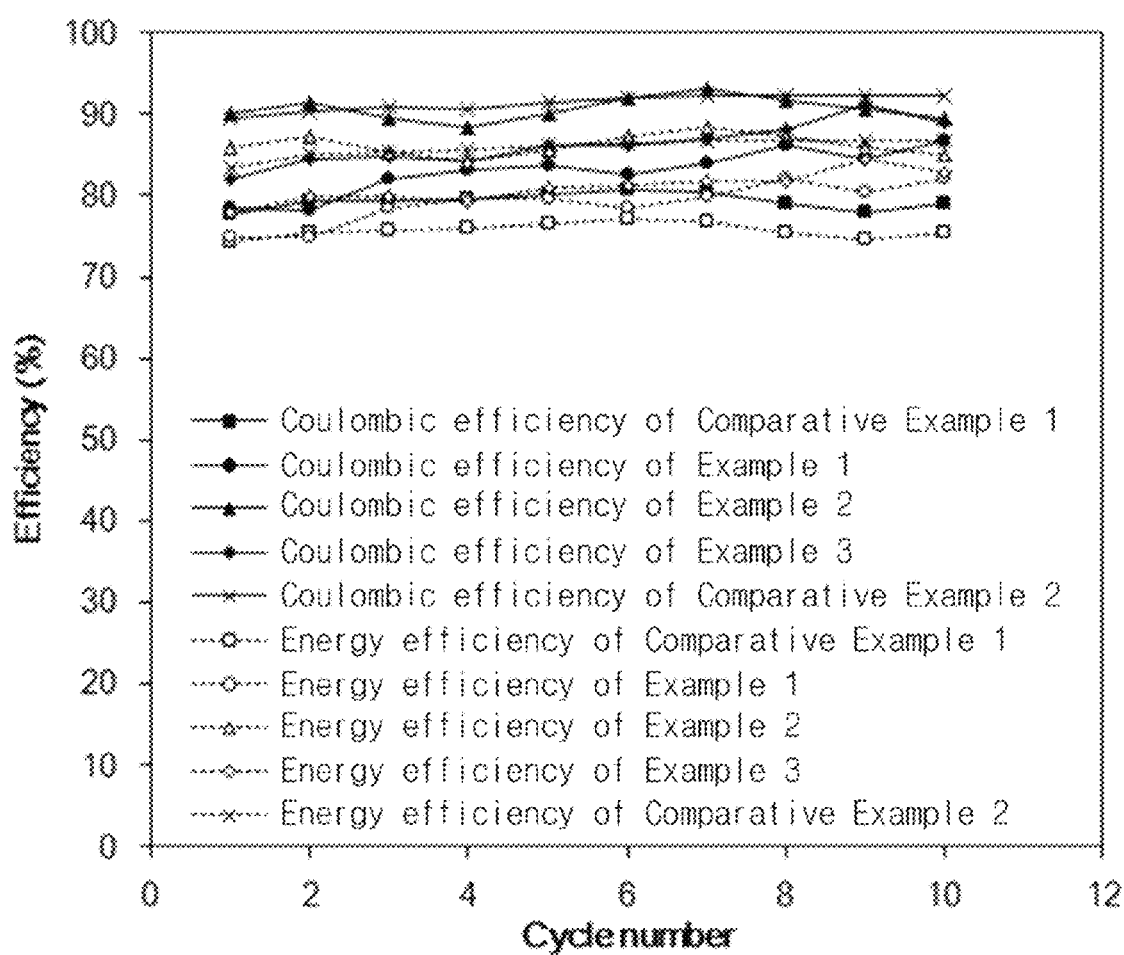
FIG. 9 is a graph depicting relationship between the number of cycles and coulombic efficiency and energy efficiency of organic-inorganic composite anion exchange membranes having different silica contents.

Coulombic efficiency, voltage efficiency and energy efficiency of each of the anion exchange membranes were determined according to Equations 5 to 7. Results are shown in FIGS. 8 and 9.

$$\text{Coulombic efficiency (\%)} = \frac{C_d}{C_c} \times 100, \quad \langle\text{Equation 5}\rangle$$

where $C_d$ is discharge capacity and $C_c$ is charge capacity.

$$\text{Voltage efficiency (\%)} = \frac{V_d}{V_c} \times 100, \quad \langle\text{Equation 6}\rangle$$

where $V_d$ is an average value of discharge voltages and $V_c$ is an average value of charge voltages.

Energy efficiency (%)=Coulombic efficiency×Voltage efficiency  <Equation 7>

(1) Comparison of Potentials Depending Upon Battery Capacity

As shown in FIG. 8, comparison of potentials of battery using the anion exchange membranes with different silica contents depending upon battery capacity showed that the anion exchange membrane of Example 2 had the highest discharge capacity. From this result, an optimal silica content of an anion exchange membrane for non-aqueous redox flow batteries could be confirmed.

(2) Comparison of Coulombic Efficiency and Energy Efficiency

In addition, as shown in FIG. 9, comparison of coulombic efficiency and energy efficiency of the anion exchange membranes depending upon the number of cycles at a current density of 0.1 $mA/cm^2$ showed that the anion exchange membranes of Examples 1 and 2 exhibited increased coulombic efficiency while the anion exchange membrane of Example 3 had a tendency of decreasing coulombic efficiency, which coincided with the results of ionic conductivity as mentioned above. Specifically, it was confirmed that the anion exchange membrane of Example 2 exhibited higher coulombic efficiency than the commercially available anion exchange membrane of Comparative Example 2.

As can be seen from the above, coulombic efficiency at a given current density is proportional to ionic conductivity of the ion exchange membrane, and voltage efficiency shows a tendency to decrease from Example 1 to Example 3 depending upon the thickness of the membrane prepared in proportion to the amount of silica nanopowder.

In conclusion, the anion exchange membrane of Example 2 having good ionic conductivity exhibited high coulombic efficiency, voltage efficiency higher than Comparative Example 2, thereby exhibiting high energy efficiency.

This confirms again that 5% silica content in the anion exchange membrane of Example 2 is the optimum ratio for non-aqueous redox flow batteries.

Experimental Example 8: Comparison of Coulombic Efficiency of Anion Exchange Membrane for Non-Aqueous Redox Flow Batteries Depending Upon Kinds of Monomers Performance of unit cells of the organic-inorganic composite anion exchange membranes of Example 2, Example 4 and Example 5 having the same silica content but different kinds of monomers was evaluated. Evaluation was repeated using 40 mL of 0.05 M V(acac)$_3$/1 M TEABF$_4$ as both electrolytes at a constant current density of 0.7 mA/cm$^2$, and cut-off voltages of 1.6 V and 2.8 V.

Coulombic efficiency, voltage efficiency and energy efficiency of each of the membranes were determined according to Equations 5 to 7 as in Experimental Example 5.

(1) Comparison of Potentials Depending Upon Battery Capacity

Figure 10:
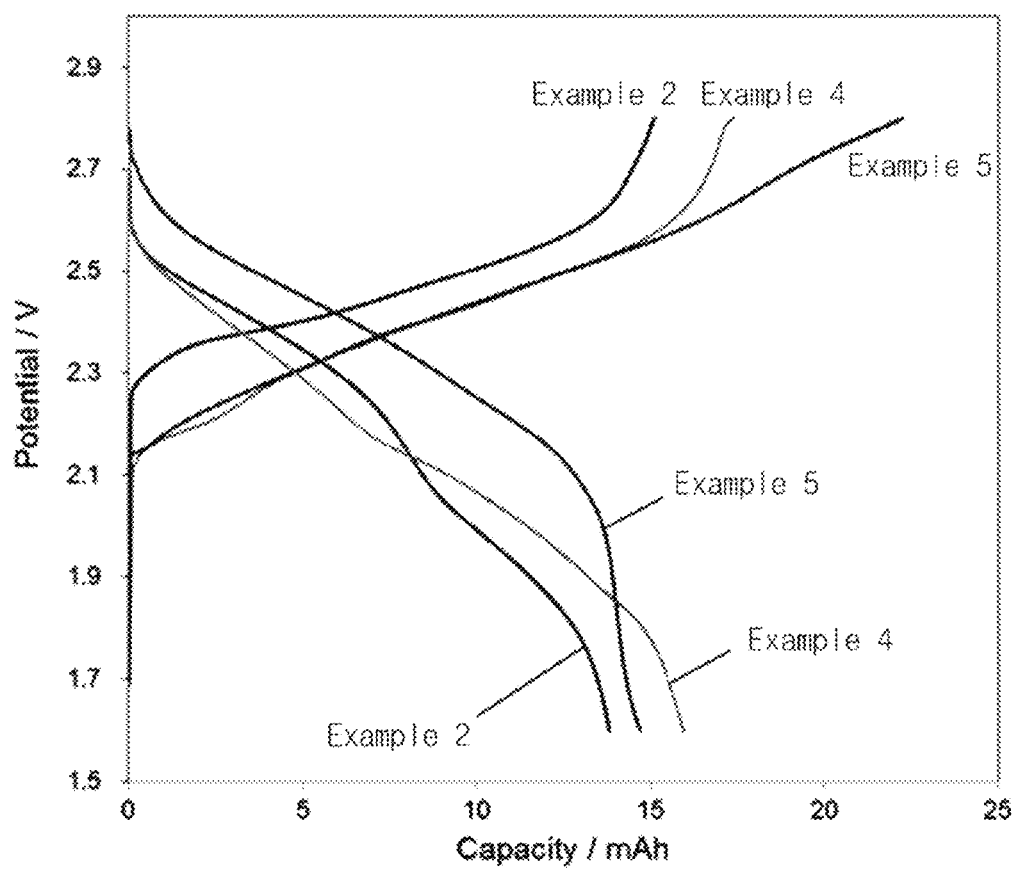
FIG. 10 is a graph depicting relationship between potential and capacity of organic-inorganic composite anion exchange membranes having different kinds of monomers.

As shown in FIG. 10, when the anion exchange membranes of Examples 2, 4 and 5 were used, discharge capacities were 13.8 mAh, 15.9 mAh and 14.7 mAh, respectively. This shows that different kinds of monomers in the anion exchange membranes of Examples 2, 4 and 5 had an influence on change in battery capacity.

Specifically, it was confirmed that the battery prepared using the anion exchange membrane of Example 4 showed the highest capacity.

The anion exchange membranes of Example 2 and Comparative Example 4 having a non-porous structure showed similar voltage drop to that upon initial discharge. The anion exchange membrane of Example 5 having a porous structure showed low voltage drop and had much lower ohmic resistance than that of the anion exchange membrane having a non-porous structure. Further, it was confirmed that the anion exchange membranes of Examples 4 and 5 having aromatic functional groups showed improved discharge capacity as compared with the anion exchange membrane of Example 2 having aliphatic functional groups.

(2) Comparison of Coulombic Efficiency and Energy Efficiency

Figure 11:
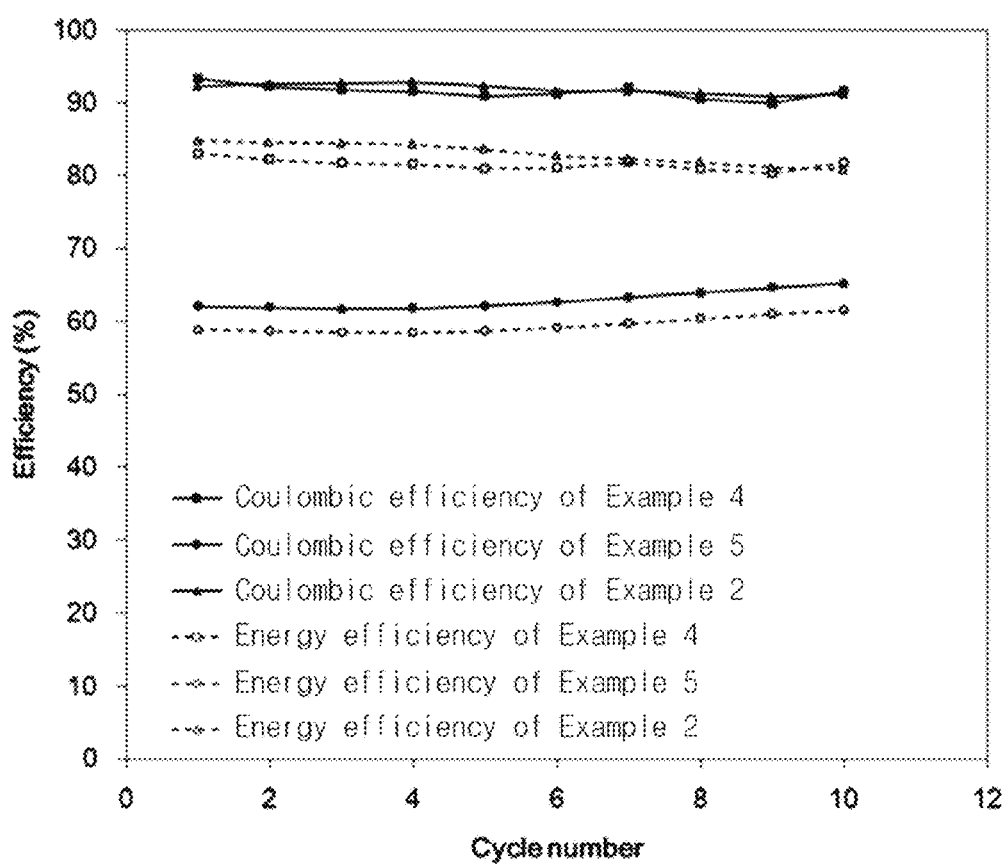
FIG. 11 is a graph depicting relationship between the number of cycles and coulombic efficiency and energy efficiency of organic-inorganic composite anion exchange membranes having different kinds of monomers.

As shown in FIG. 11, comparison of coulombic efficiency and energy efficiency of the anion exchange membranes depending upon the number of cycles at a current density of 0.7 mA/cm$^2$ showed that the anion exchange membranes of Examples 2, 4 and 5 exhibited relatively stable coulombic efficiency (about 90%) and energy efficiency (about 80%) after the 6$^{th}$ cycles.

The anion exchange membrane of Example 5 having a porous structure showed an energy efficiency of about 60% corresponding to relatively low coulombic efficiency. However, when charge and discharge operation was performed at a current density of 3 mA/cm$^2$, it was confirmed that the anion exchange membrane of Example 5 having a porous structure showed energy efficiency of about 80%.

Although the present invention has been described with reference to some embodiments, it should be understood that the foregoing embodiments are provided for illustration only and are not to be construed in any way as limiting the present invention, and that various modifications, changes, alterations, and equivalent embodiments can be made by those skilled in the art without departing from the spirit and scope of the invention.

What is claimed is:

1. An anion exchange membrane for non-aqueous redox flow batteries, comprising:
   (A) silica particles;
   (B) a polyvinylidene fluoride polymer represented by Formula 1:

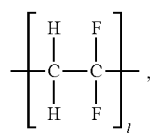

(1)

(where l is an integer ranging from 5,000 to 500,000); and
(C) a divinylbenzene polymer,
wherein
the silica particles are present in an amount ranging from 5 wt % to 10 wt % based on the amount of polyvinylidene fluoride polymer,
the silica particles have a particle size ranging from 5 nm to 20 nm, and
the divinylbenzene polymer is a polymer having a structure selected from structures represented by Formulae 3, 3a, 3b, or a mixture thereof:

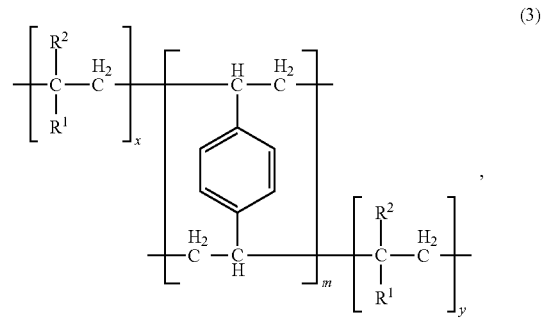

(3)

where m is an integer ranging from 1 to 500,000, and 1≤x+y≤500,000, and x and y are integers;

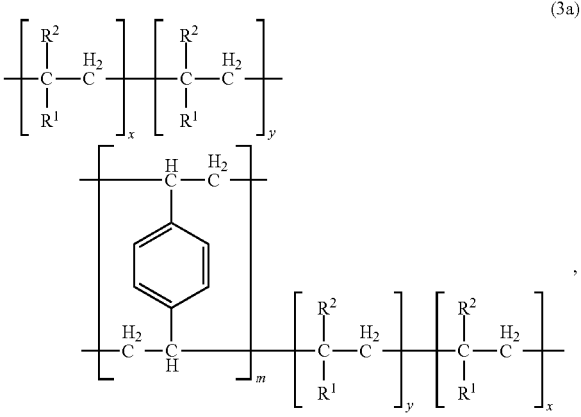

(3a)

where two x's are identical or different from each other, four y's are identical or different from one another, m is an integer ranging from 1 to 500,000, and 1≤x+y≤500,000, and x and y are integers; and

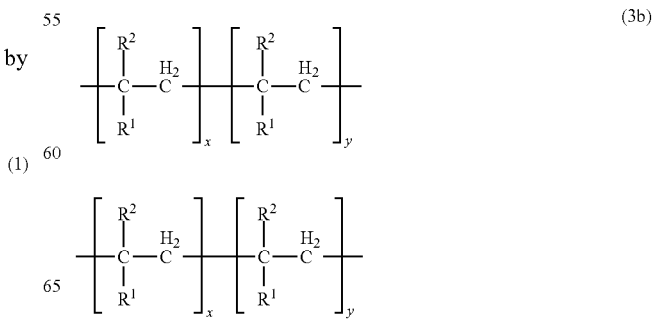

(3b)

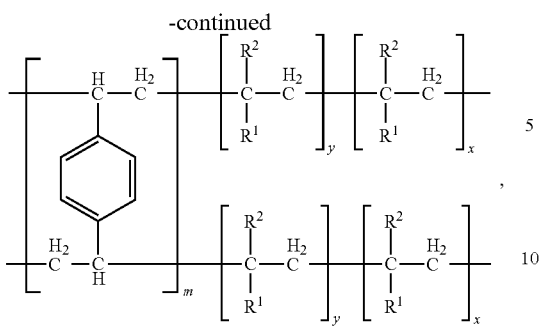

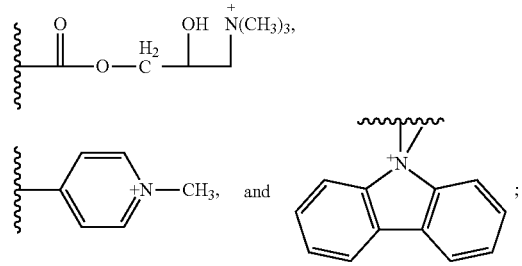

where four x's are identical or different from each other, four y's are identical or different from one another, m is an integer ranging from 1 to 500,000, and 1≤x+y≤500,000, and x and y are integers, wherein in Formulae 3, 3a, and 3b:

$R^1$ is at least one selected from the group consisting of a pyridine cation substituted with a linear or branched $C_1$ to $C_6$ alkyl group, a pyrrole cation substituted with a linear or branched $C_1$ to $C_6$ alkyl group, an indole cation substituted with a linear or branched $C_1$ to $C_6$ alkyl group, a carbazole cation substituted with a linear or branched $C_1$ to $C_6$ alkyl group, a pyrimidine cation substituted with a linear or branched $C_1$ to $C_6$ alkyl group, an imidazole pyridinyl cation substituted with a linear or branched $C_1$ to $C_6$ alkyl group, and a pyrazolyl cation substituted with a linear or branched $C_1$ to $C_6$ alkyl group, $R^2$ is H or $CH_3$.

2. The anion exchange membrane for non-aqueous redox flow batteries according to claim 1, wherein m is an integer ranging from 1 to 100,000; and 1≤x+y≤100,000, and x and y are integers.

3. The anion exchange membrane for non-aqueous redox flow batteries according to claim 1, wherein $R^1$ is at least one selected from among m is an integer ranging from 1 to 100,000; and 1≤x+y≤100,000, and x and y are integers.

4. The anion exchange membrane for non-aqueous redox flow batteries according to claim 1, wherein the initiator comprises at least one selected from among benzoyl peroxide, acetyl peroxide, lauroyl peroxide, 2,2'-azobisisobutyronitrile, tert-butyl peroxide, 4,4-azobis(4-cyanovaleric acid), 1,1'-azobis(cyclohexanecarbonitrile), and tert-butyl peracetate.

5. The anion exchange membrane for non-aqueous redox flow batteries according to claim 1, wherein the anion exchange membrane has a thickness of 10 μm to 100 μm.

6. The anion exchange membrane for non-aqueous redox flow batteries according to claim 1, wherein the anion exchange membrane has an ionic conductivity of $2.4 \times 10^{-4}$ S/cm or more, and the ionic conductivity is calculated according to Equation 4:

$$\text{Ion conductivity (S/cm)} = \frac{l}{MER}, \qquad \langle\text{Equation 4}\rangle$$

wherein l is a thickness of the membrane and MER is resistance of the membrane.

7. A non-aqueous redox flow battery, comprising:
a positive electrolyte;
a negative electrolyte; and
the anion exchange membrane according to claim 1, the anion exchange membrane being disposed between the positive electrolyte and the negative electrolyte.

* * * * *